(12) United States Patent
Ishii et al.

(10) Patent No.: US 7,804,745 B2
(45) Date of Patent: Sep. 28, 2010

(54) OPTICAL PICKUP AND OPTICAL DISK DEVICE

(75) Inventors: Kazuyoshi Ishii, Tokyo (JP); Yoshikazu Asai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 598 days.

(21) Appl. No.: 11/763,807

(22) Filed: Jun. 15, 2007

(65) Prior Publication Data
US 2008/0013413 A1    Jan. 17, 2008

(30) Foreign Application Priority Data
Jul. 11, 2006  (JP)  ............... 2006-190419

(51) Int. Cl.
*G11B 7/00* (2006.01)
(52) U.S. Cl. ............. 369/44.15; 369/44.14; 369/112.24
(58) Field of Classification Search ............. 369/44.15, 369/44.14, 44.23, 53.11, 13.2, 112.24; 359/811; 720/682, 683
See application file for complete search history.

(56) References Cited

U.S. PATENT DOCUMENTS

| | | | | | |
|---|---|---|---|---|---|
| 5,886,978 | A | * | 3/1999 | Matsui | 720/682 |
| 6,167,003 | A | * | 12/2000 | Haneji et al. | 369/53.11 |
| 6,341,102 | B1 | * | 1/2002 | Sato et al. | 369/13.2 |
| 6,594,223 | B2 | * | 7/2003 | Suzuki et al. | 720/683 |
| 6,665,238 | B2 | * | 12/2003 | Ijima et al. | 369/44.15 |
| 6,785,063 | B2 | * | 8/2004 | Peng et al. | 359/811 |
| 6,920,104 | B2 | * | 7/2005 | Kim | 369/112.24 |
| 7,054,235 | B2 | * | 5/2006 | Tsukuda et al. | 369/44.15 |
| 7,411,875 | B2 | * | 8/2008 | Nogami | 369/44.15 |
| 2005/0180274 | A1 | * | 8/2005 | Im et al. | 369/44.15 |
| 2005/0185530 | A1 | * | 8/2005 | Akanuma | 369/44.15 |
| 2005/0190664 | A1 | * | 9/2005 | Inui et al. | 369/44.15 |

FOREIGN PATENT DOCUMENTS

JP    2001-229554    8/2001

* cited by examiner

*Primary Examiner*—Thuy N Pardo
(74) *Attorney, Agent, or Firm*—Fitzpatrick, Cella, Harper & Scinto

(57) ABSTRACT

An optical disk device for driving an optical disk having a rotation center and a recording track around the rotation center. The device includes a light source which emits a light beam, an objective lens which irradiates a position on the recording track of the optical disk with the light beam from the light source, and a lens holding member which holds the objective lens. The lens holding member has a plurality of fitting sections. A plurality of elastic supporting members each has a longitudinal length and is fitted at one end thereof to one of the fitting sections of the lens holding member, and a supporting unit base has a plurality of anchor sections supporting the other end of each of the elastic supporting members. The plurality of anchor sections are arranged on first and second sides with reference to a tangent line hypothetically drawn tangentially to the recording track at the position irradiated with the light beam via the objective lens, the rotation center of the optical disk being located on the second side. Each of the anchor sections that are arranged on the first side are arranged closer to the objective lens in the extending direction of the tangent line than are the anchor sections arranged on the second side.

3 Claims, 8 Drawing Sheets

OPTICAL PICKUP AND OPTICAL DISK DEVICE

This application claims the benefit of Japanese Patent Application No. 2006-190419, filed Jul. 11, 2006, which is hereby incorporated by reference herein in its entirety.

BACKGROUND OF THE INVENTION

Field of the Invention

The present invention relates to an optical pickup for recording or reproducing information signals by focusing a laser beam onto an information signal recording layer of an optical disk, and also, to an optical disk device including such an optical pickup.

Optical disk devices for recording information signals on and reproducing information signals from an optical disk are being widely used. FIG. 6 of the accompanying drawings schematically illustrates such an optical disk device. Shown in FIG. 6, are an optical pickup 1 and a spindle motor 2 for driving an optical disk to rotate the disk.

Also shown in FIG. 6, are a guide shaft 3 supporting the optical pickup 1 and a chassis 4 where the optical pickup 1 and the spindle motor 2 are mounted. The optical pickup 1 includes an optical unit base 5, a polarization beam splitter 7, a collimator lens 8, a quarter-wave plate 9, a mirror 10, a sensor lens 11, a sensor 12 and an actuator 13.

FIGS. 7A and 7B are, respectively, a schematic perspective view and a plan view of the actuator 13. The actuator 13 is formed by an actuator base unit 14, magnetic circuits 15$a$ and 15$b$ rigidly secured onto the actuator unit base 14, a supporting base unit 16, an objective lens 17 and a lens holding member 18 holding the object lens 17.

The lens holding member 18 is held by the front ends of elastic supporting members 20$a$1, 20$a$2, 20$b$1 and 20$b$2, which are two pairs of (four) wire members, at fitting sections 19$a$1, 19$a$2, 19$b$1 and 19$b$2, formed at opposite ends thereof. The base ends of the elastic supporting members 20$a$1, 20$a$2, 20$b$1 and 20$b$2 are rigidly secured to anchor sections 21$a$1, 21$a$2, 21$b$1 and 21$b$2 arranged at the supporting unit base 16.

With the above-described structure, the lens holding member 18 is held so as to be displaceable in the vertical and radial directions relative to the optical disk 1. The lens holding member 18 is provided with a drive coil (not illustrated), such that it is possible to drive the lens holding member 18 by means of the electromagnetic force generated by the electrical current supplied to the drive coil and the magnetic flux that is generated by the magnetic circuits 15$a$ and 15$b$.

FIG. 8 schematically illustrates an optical disk 50 mounted on the spindle motor 2 of the optical disk device. The optical disk 50 has an information signal recording layer made of a phase change material that can reversibly change the phase. A spiral recording track is, or concentric recording tracks are, formed on the information signal recording layer.

The information signal recording layer maybe made of a metal reflector film where information signals are formed in advance by means of pits (recesses and projections). FIG. 8 also shows an outer edge 22 of the optical disk, the innermost periphery T1 and the outermost periphery T2 of the recording track or tracks, and the laser beam irradiation position P by the optical pickup 1.

For recording or reproducing an information signal, first, the optical disk 50 is driven to rotate, by the spindle motor 2. The laser beam generated from the laser beam source 6 is transmitted through the polarization beam splitter 7 and collimated by the collimator lens 8.

Then, the laser beam is transmitted through the quarter-wave plate 9 so as to be turned from a linearly polarized beam into a circularly polarized beam, and the circularly polarized laser beam is reflected by the mirror 10 ninety degrees, and converged to a micro-spot of a light by means of the objective lens 17 before the reflected laser beam is irradiated onto the information signal recording layer of the optical disk 50.

Reflected light from the information signal recording layer is then collimated again by the objective lens 17 and transmitted through the quarter-wave plate 9 so as to be turned from a circularly polarized beam into a linearly polarized beam. Since the linearly polarized beam is rotated by ninety degrees relative to the forwardly proceeding incident light in the sense of polarization, the linearly polarized beam is reflected by the polarization beam splitter 7 after being transmitted through the collimator lens 8 and focused to the sensor 12 by the sensor lens 11.

The sensor 12 has a light receiving plane that is divided into a plurality of sectional planes, and a focusing error signal and a tracking error signal are generated by a control circuit (not illustrated) from the detection signal of the sectional light receiving planes. Then, a control current is supplied to the actuator 13 according to the error signals. The actuator 13 drives the movable part of the optical pickup in the direction perpendicular to the optical disk 50, and also in the radial direction orthogonal relative to the recording track.

In this way, if the optical disk 50 is displaced in the perpendicular direction by axial deflection, the laser beam is always controlled by the focusing error signal so that the laser beam is accurately converged to a micro-spot of light on the recording track. Additionally, if the recording track is displaced in a radial direction due to eccentricity of the optical disk 50, the tracking operation of the optical pickup is always controlled by the tracking error signal, so that the laser beam follows the displacement for a scanning operation.

Thus, in a signal recording operation, the optical pickup irradiates highly intense recording light, which is pulse-modulated by an information signal, onto the information signal recording layer so as to repeatedly heat and cool the information signal recording layer, while maintaining the controlled condition, and, thereby, record recording marks whose phase state is changed to an amorphous phase or a crystal phase in accordance with the information signal, depending on the process. In a signal reproducing operation, on the other hand, the optical pickup irradiates lowly intense reproduction light onto the information signal recording layer and detects reflected light from the recording marks by means of the sensor to reproduce the information signal.

The optical pickup 1 is driven by a transfer unit (not illustrated), such as a motor, so that the optical pickup 1 can move the laser beam irradiating position P to any radial position between the innermost periphery T1 of the recording track or tracks and the outermost periphery T2 of the recording track or tracks, whichever is appropriate.

Particularly, in recent years, optical disk devices have been finding an ever-increasing number of applications in portable electronic apparatus, such as digital video cameras and other moving picture recording apparatus, as the capacity of the optical disk devices has increased. While optical disks generally have a diameter of 12 cm according to the specifications, optical disks downsized to have a diameter of 8 cm for the purpose of being contained in portable electronic apparatuses, and optical disk devices dedicated to such optical disks have also been marketed. Japanese Patent Application Laid-Open No. 2001-229554 describes such an optical disk device.

For suppliers of optical disk devices to be contained in such portable electronic apparatuses, it is an important challenge to further downsize and reduce the weight of an optical disk device. However, the profile of the optical pickup provides an obstacle to the efforts for downsizing. This will be discussed below.

FIG. 8 schematically illustrates the condition where the optical pickup 1 of a conventional optical disk device is located right above the outermost periphery T2 of the recording track or tracks of an optical disk. Under this condition, the optical pickup 1 partly projects to the outside of the outer edge 22 of the optical disk 50.

Particularly, the elastic supporting members 20a1, 20a2, 20b1 and 20b2 of the actuator 13 are provided as two, or more than two, pairs and fitted to the fitting sections at opposite ends of the lens holding member 18, so as to run substantially in parallel with the recording track or tracks of the optical disk 50.

The elastic supporting members 20a1, 20a2, 20b1 and 20b2 require a minimum length to give rise to a desired degree of elasticity. For this reason, a part of the supporting unit base 16 that rigidly secures the base ends of the elastic supporting members 20a1, 20a2, 20b1 and 20b2 projects outward to the greatest extent from the outer edge 22 of the optical disk 50. This problem is particularly serious in optical disk devices dedicated to optical disks having a small diameter.

Thus, if the chassis 4 is downsized to minimum dimensions, to make the outer dimensions thereof come closer to the outer dimensions of the optical disk 50, the above-identified part projects noticeably outwardly from the outer edge 22 of the optical disk, and constitutes a serious problem to be resolved in the course of downsizing optical disk devices.

SUMMARY OF THE INVENTION

According to the present invention, of the plurality of elastic supporting members arranged in parallel between the opposite lateral surfaces of the lens holding member and the supporting unit base, elastic supporting members that correspond to the inner peripheral side of the optical disk and elastic supporting members that correspond to the outer peripheral side of the optical disk are arranged transversally asymmetrically. More specifically, the elastic supporting members that correspond to the outer peripheral side of the optical disk are shifted forwardly relative to the lens holding member, whereas the elastic supporting members that correspond to the inner peripheral side of the optical disk are shifted backwardly relative to the lens holding member. With this arrangement, the extent to which the optical pickup projects outward from the outer edge of the optical disk is reduced.

Further features of the present invention will become apparent from the following description of exemplary embodiments, with reference to the attached drawings.

DESCRIPTION OF THE EMBODIMENTS

Now, the present invention will be described in greater detail by referring to the accompanying drawings, which illustrate exemplary embodiments of the invention.

First Embodiment

Figure 1:
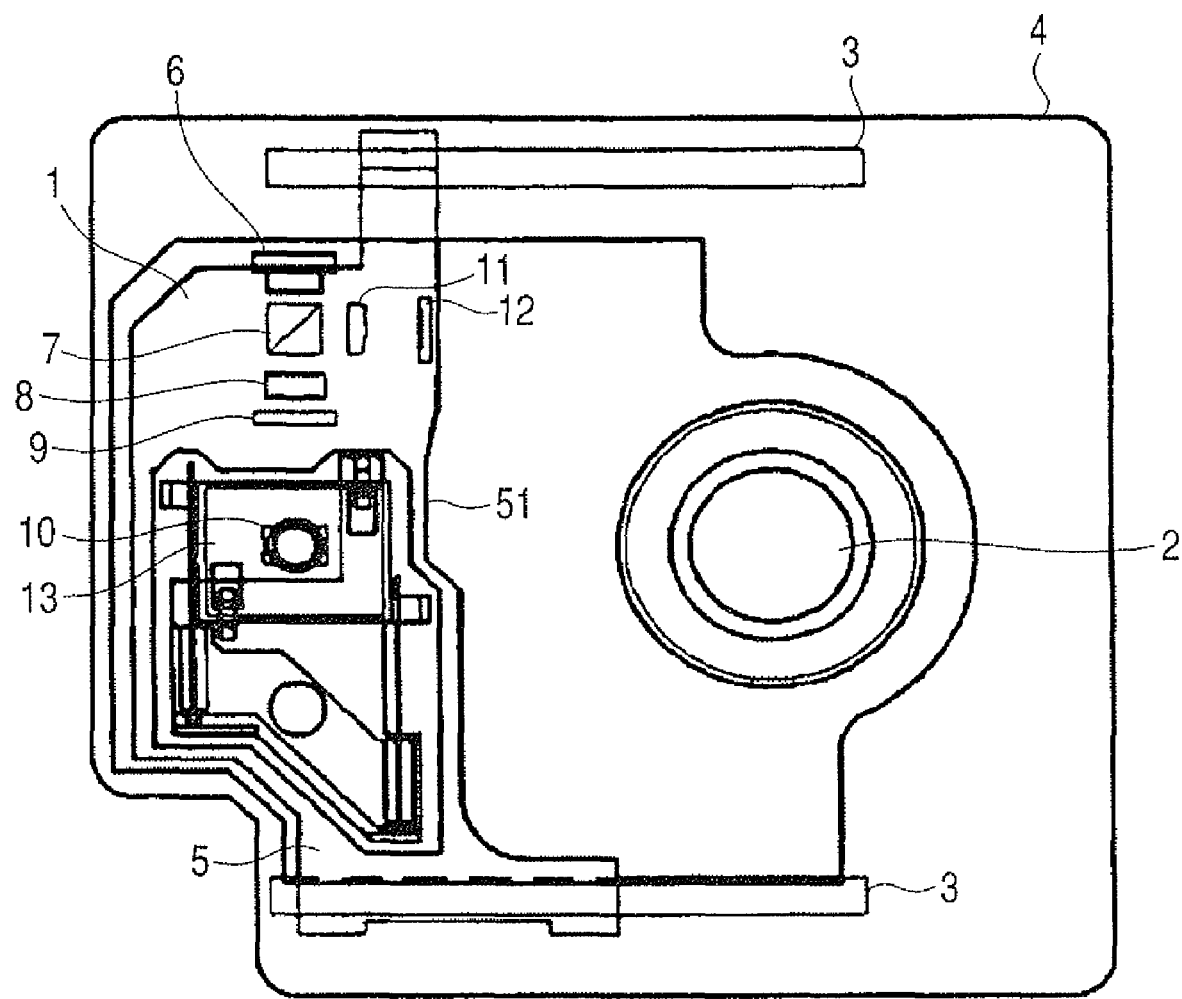
FIG. 1 is a schematic plan view of the first embodiment of an optical disk device according to the present invention.
Figure 6:
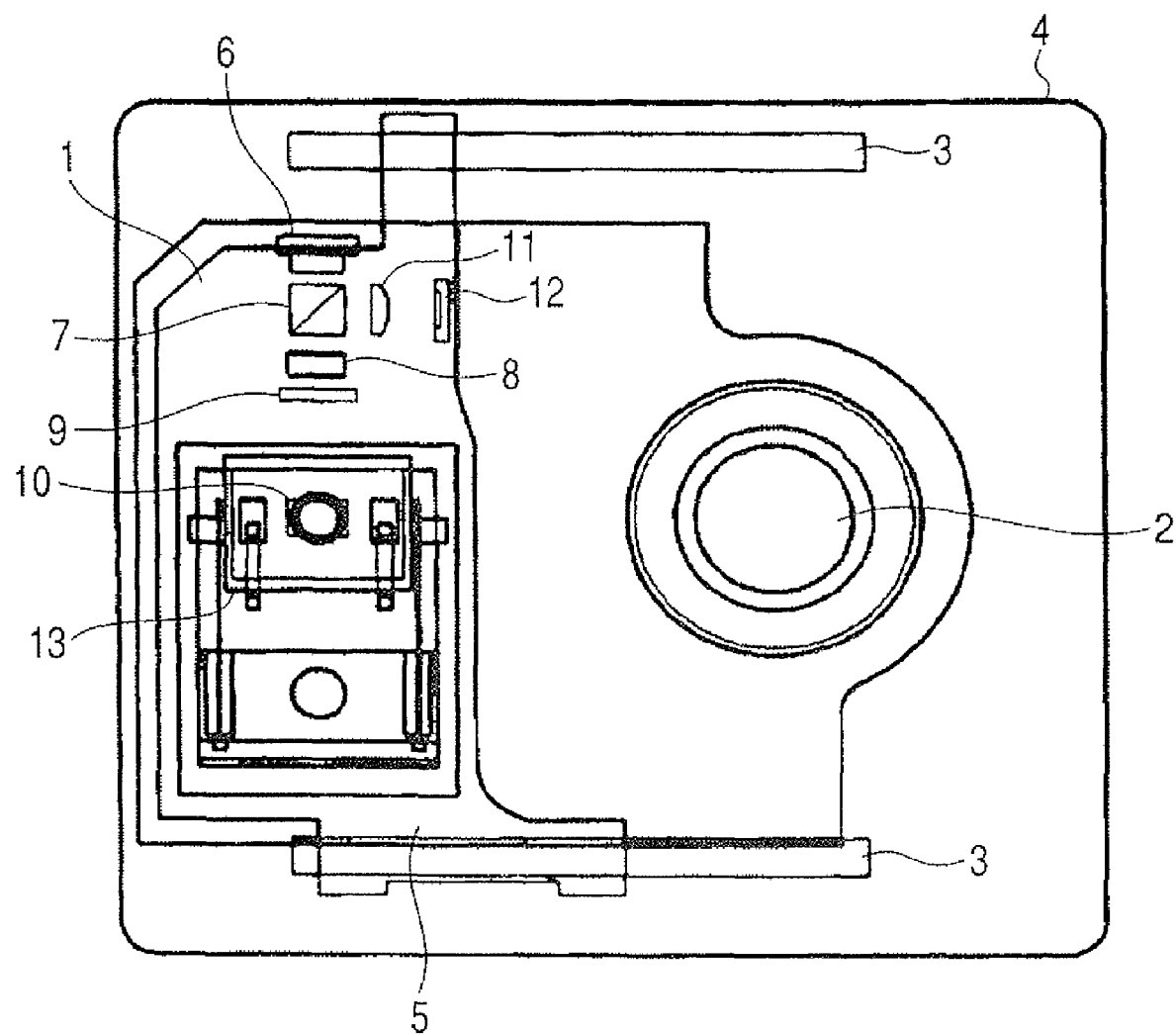
FIG. 6 is a schematic plan view of a known optical disk device.

FIG. 1 is a schematic plan view of the first embodiment of an optical disk device according to the present invention. In FIG. 1, the components that are the same as the components of the known device of FIG. 6 are denoted respectively by the same reference symbols. The difference between the embodiment of FIG. 1 and the known device of FIG. 6 mainly lies in the structure of the actuator 13.

Since the configuration and the operation of the optical disk device according to the present invention are similar to the configuration and the operation of the known device illustrated in FIG. 6, except for the optical pickup 1, they will not be described in detail in the following. Only the chassis 4 and the optical pickup 1 of this embodiment, particularly, the actuator 13 in particular, will be described below in detail, in terms of configuration.

Figure 2A:
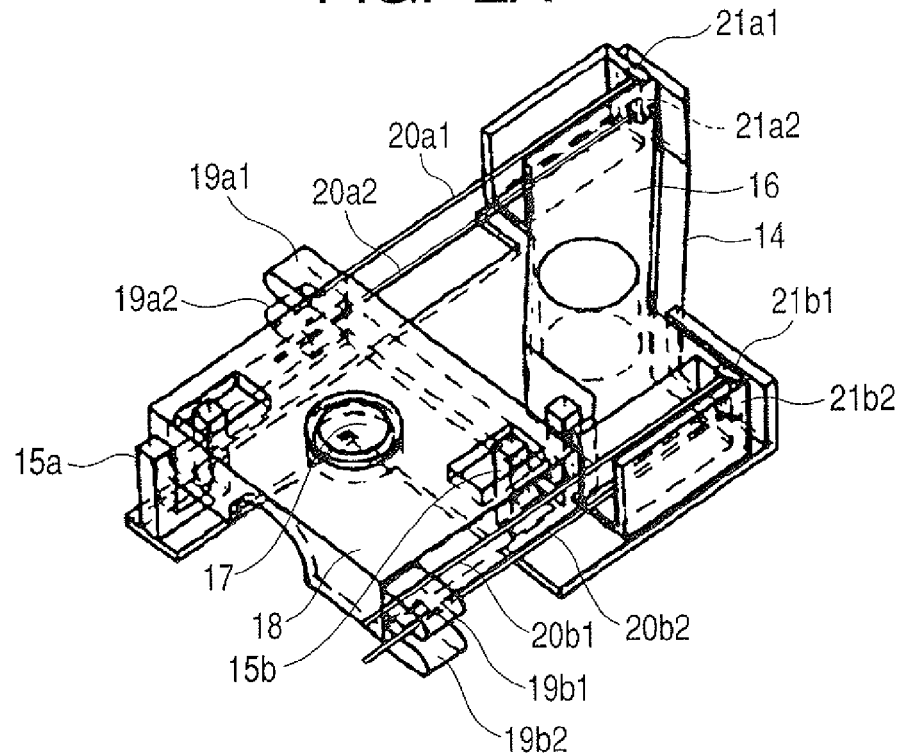
FIGS. 2A and 2B are a schematic perspective view and a schematic plan view of the first embodiment of an actuator according to the present invention.
Figure 2B:
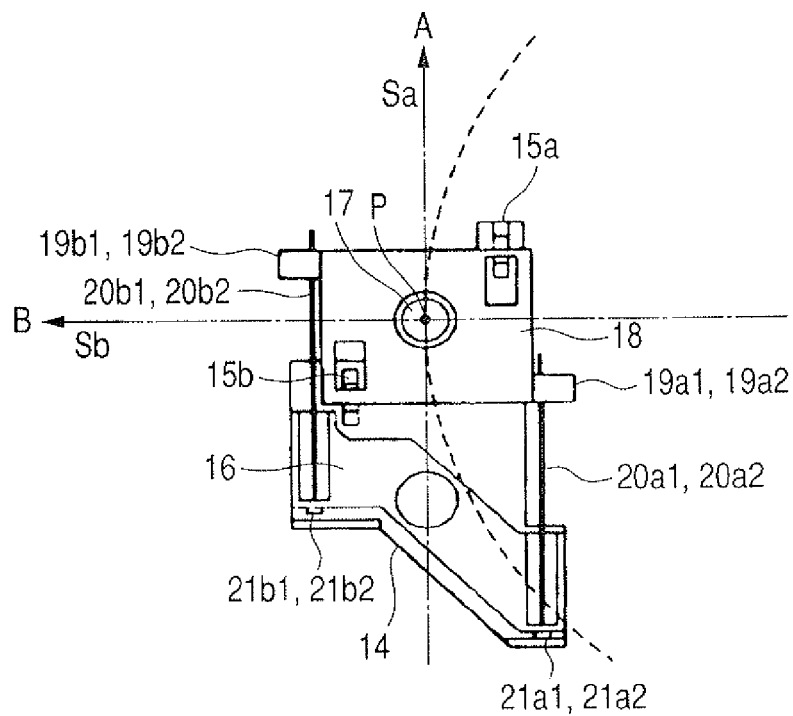

FIG. 2A is a schematic perspective view of the actuator 13 according to the present invention and FIG. 2B is a schematic plan view thereof. The actuator 13 is formed by an actuator unit base 14, magnetic circuits 15a and 15b rigidly secured onto the actuator unit base 14, a supporting unit base 16, an objective lens 17 and a lens holding member 18 holding the objective lens 17.

The lens holding member 18 is held by the front ends of elastic supporting members 20a1, 20a2, 20b1 and 20b2, which are two pairs of (four) wire members, at fitting sections 19a1, 19a2, 19b1 and 19b2, formed at opposite ends thereof. The base ends of the elastic supporting members 20a1, 20a2, 20b1 and 20b2 are rigidly secured to the supporting unit base 16.

With the above-described structure, the lens holding member 18 is held so as to be displaceable in the vertical and radial directions relative to the optical disk. The lens holding member 18 is provided with magnets and a drive coil (not illustrated), such that it is possible to drive the lens holding member 18 by means of the electromagnetic force generated by the electrical current supplied to the drive coil and the magnetic flux that is generated by the magnetic circuits 15a and 15b.

FIG. 2B illustrates the tangent line to the recording track of the optical disk at the position P of the laser beam irradiated from the objective lens 17 onto the optical disk (in FIG. 2B, arrow A indicates the direction of the tangent line, or the front side of the optical disk device).

The elastic supporting members 20a1 and 20a2 are arranged substantially in parallel with each other in the inner region (the region that includes the center of the optical disk) that includes the tangent line to the recording track and is separated by an imaginary plane Sa that is perpendicular to the optical disk. The elastic supporting members 20b1 and 20b2 are arranged substantially in parallel with each other in the outer region.

It is important to arrange the elastic supporting member 20a1, 20a2, 20b1 and 20b2 at the opposite sides of the tangent line substantially symmetrically, so that they may not be lopsidedly located in one of the two regions from the viewpoint of maintaining the balance of the lens holding member 18 in control operations. It is desirable that all the elastic supporting members 20a1, 20a2, 20b1 and 20b2 have substantially the same length so as to show the same degree of elasticity.

FIG. 2B also illustrates the normal line to the recording track of the optical disk at the light beam irradiating position P on the recording track (in FIG. 2B, arrow B indicates the direction of the normal line).

If an imaginary plane that includes the normal line and is perpendicular to the optical disk is Sb, the fitting sections 19b1 and 19b2 at the front ends and the anchor sections 21b1 and 21b2 at the base ends of the elastic supporting members 20b1 and 20b2, which are arranged in the outer region, are located at the opposite sides relative to the imaginary plane Sb. On the other hand, the fitting sections 19a1 and 19a2 at the front ends and the anchor sections 21a1 and 21a2 at the base ends of the elastic supporting members 20a1 and 20a2, which are arranged in the inner region, are located at one side relative to the imaginary plane Sb.

In short, of the four elastic supporting members arranged in parallel with each other between the fitting sections of the lens holding member 18 and the supporting unit base 16, the two elastic supporting members 20a1 and 20a2, located at the inner peripheral side of the optical disk, and the two elastic supporting members 20b1 and 2b2, located at the outer peripheral side of the optical disk, are arranged transversally asymmetrically relative to each other.

More specifically, the elastic supporting members 20b1 and 20b2, located at the outer peripheral side of the optical disk, are arranged at a forward position of the lens holding member 18, whereas the elastic supporting members 20a1 and 20a2, located at the inner peripheral side of the optical disk, are arranged at a rearward position of the lens holding member 18. In other words, the elastic supporting members 20a1 and 20a2 are shifted rearward relative to the elastic supporting members 20b1 and 20b2.

Figure 7A:
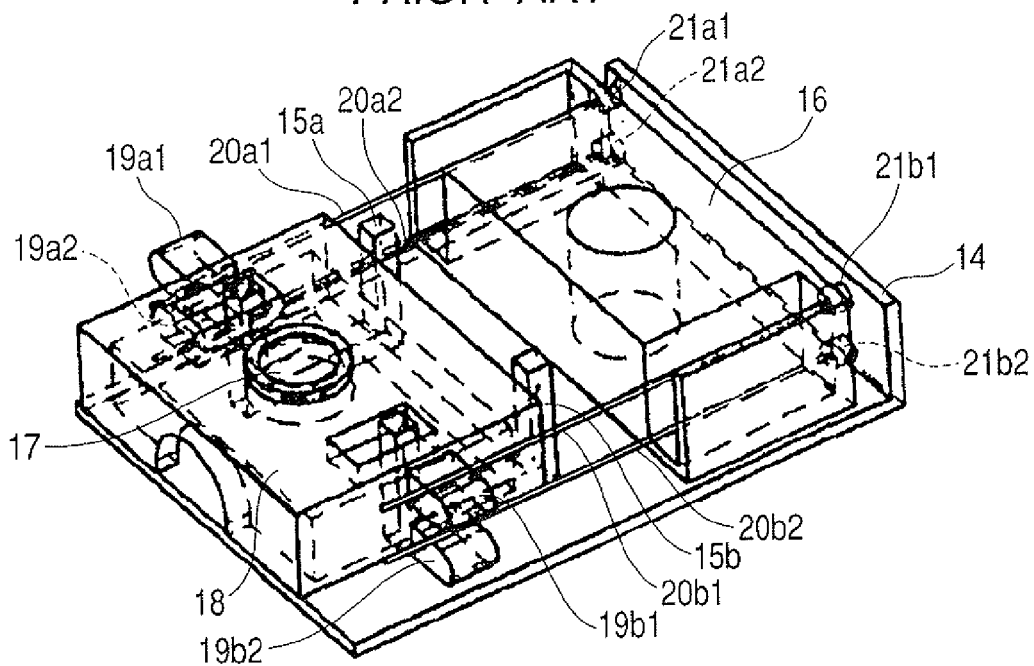
FIGS. 7A and 7B are a schematic perspective view and a schematic plan view of the actuator of the known device shown in FIG. 6.
Figure 7B:
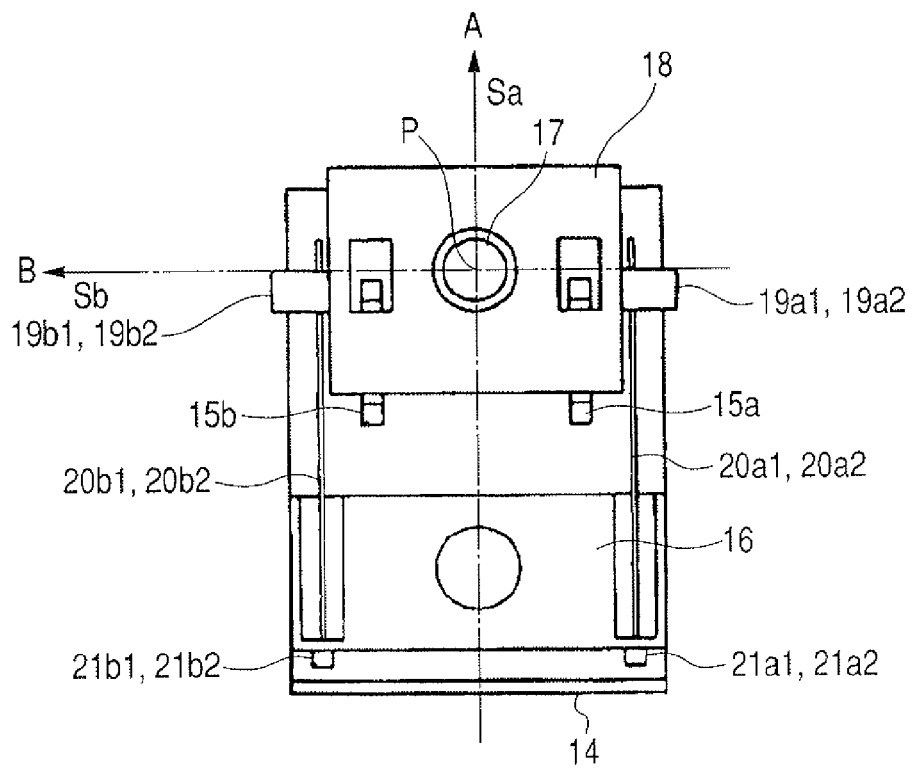

With this arrangement, the anchor sections 21b1 and 21b2 of the supporting unit base 16 that are located in the outer region can be brought closer to the objective lens 17 in the tangential direction of the recording track as indicated by arrow A, if compared with the known optical disk device illustrated in FIG. 7B. Conversely, the anchor sections 21a1 and 21a2 of the supporting unit base 16 that are located in the inner region can be moved away from the objective lens 17 in the tangential direction of the recording track as indicated by arrow A. Thus, it is possible to reduce the extent to which the optical pickup 1 projects to the outside from the outer edge of the optical disk 50.

The magnetic circuit 15a is arranged at the opposite side of the imaginary plane Sb relative to the fitting sections 19a1 and 19a2, while the magnetic circuit 15b is arranged at the opposite side of the imaginary plane Sb relative to the fitting sections 19b1 and 19b2.

Thus, the fitting sections 19a1 and 19a2 and the fitting sections 19b1 and 19b2 are arranged substantially symmetrically around the optical axis of the object lens 17, and the magnetic circuit 15a and the magnetic circuit 15b are also arranged substantially symmetrically. Additionally, the fitting sections 19a1, 19a2, 19b1 and 19b2 and the magnetic circuits 15a and 15b are separated from each other and arranged in different regions.

With this arrangement, it is possible not only to arrange the components efficiently within a minimal space, but also, to make the center of gravity of the moving part, the optical axis of the objective lens 17, the center of the drive force (the acting position of the resultant force of the drive forces generated by the magnetic circuits 15a and 15b) and the center of support agree with each other, with ease. Note that the expression of the moving part refers to the aggregate of the objective lens, the drive coil, the magnets, and so on, arranged on the objective lens holding member.

The expression of the center of the support refers to the acting position of the resultant force of the reaction forces exerted by the elastic supporting members 20a1, 20a2, 20b1 and 20b2 at the fitting sections 19a1, 19a2, 19b1, 19b2. Thus, it is possible to enhance the performance of the optical pickup 1 for maintaining the balance in control operations.

In harmony with the above-described arrangement, the overall profile of the supporting unit base 16 is made asymmetric (and illustrates a contour similar to the contour of a parallelogram). The optical unit base 5 and the chassis 4 are also made to show a minimal profile to match the positional arrangement and the profile of the actuator 13. For example, the optical unit base 5 is provided with a recess 51 at the side thereof facing the spindle motor 2.

Figure 3:
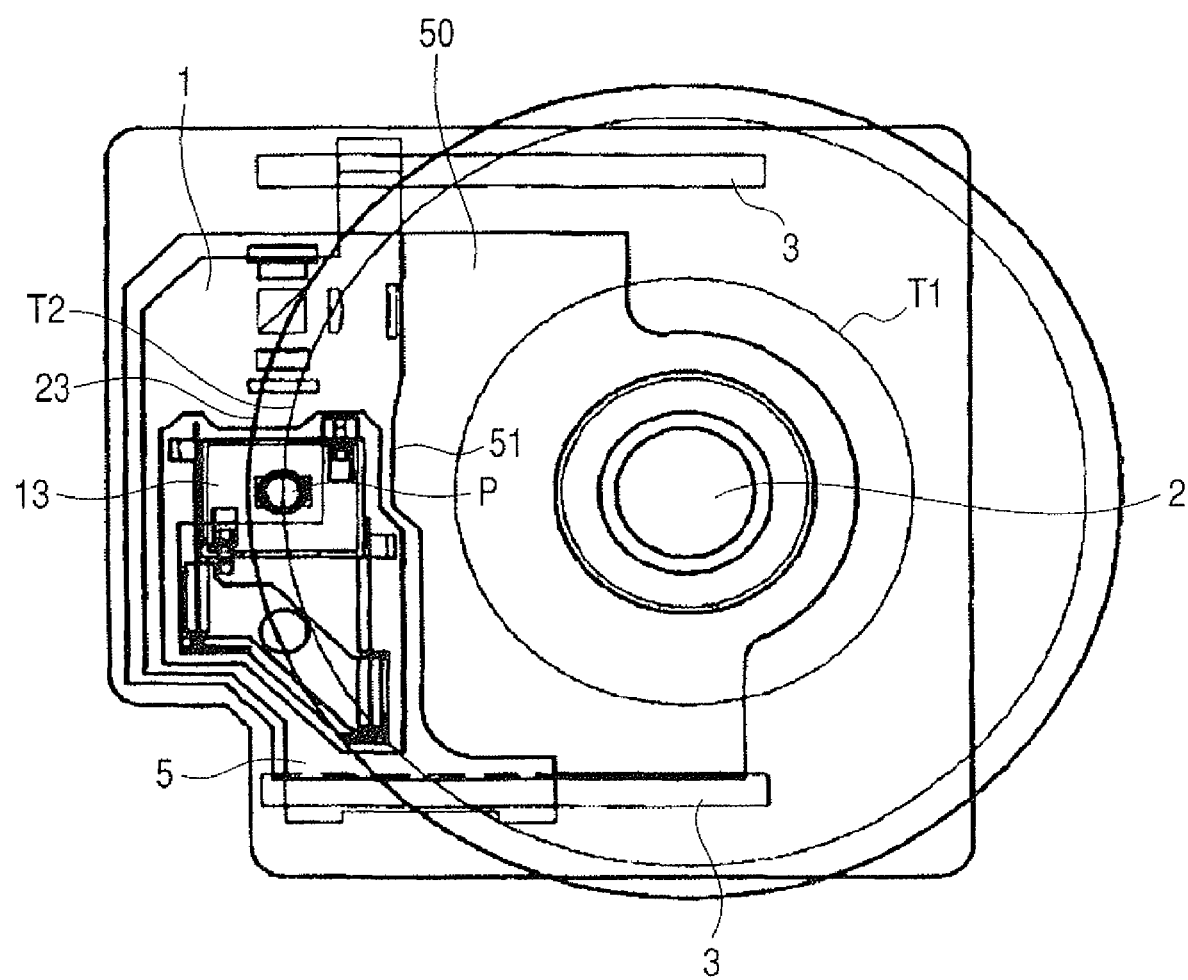
FIG. 3 is a schematic plan view of the first embodiment where the optical pickup is located right above the outermost periphery of the recording track or tracks.
Figure 8:
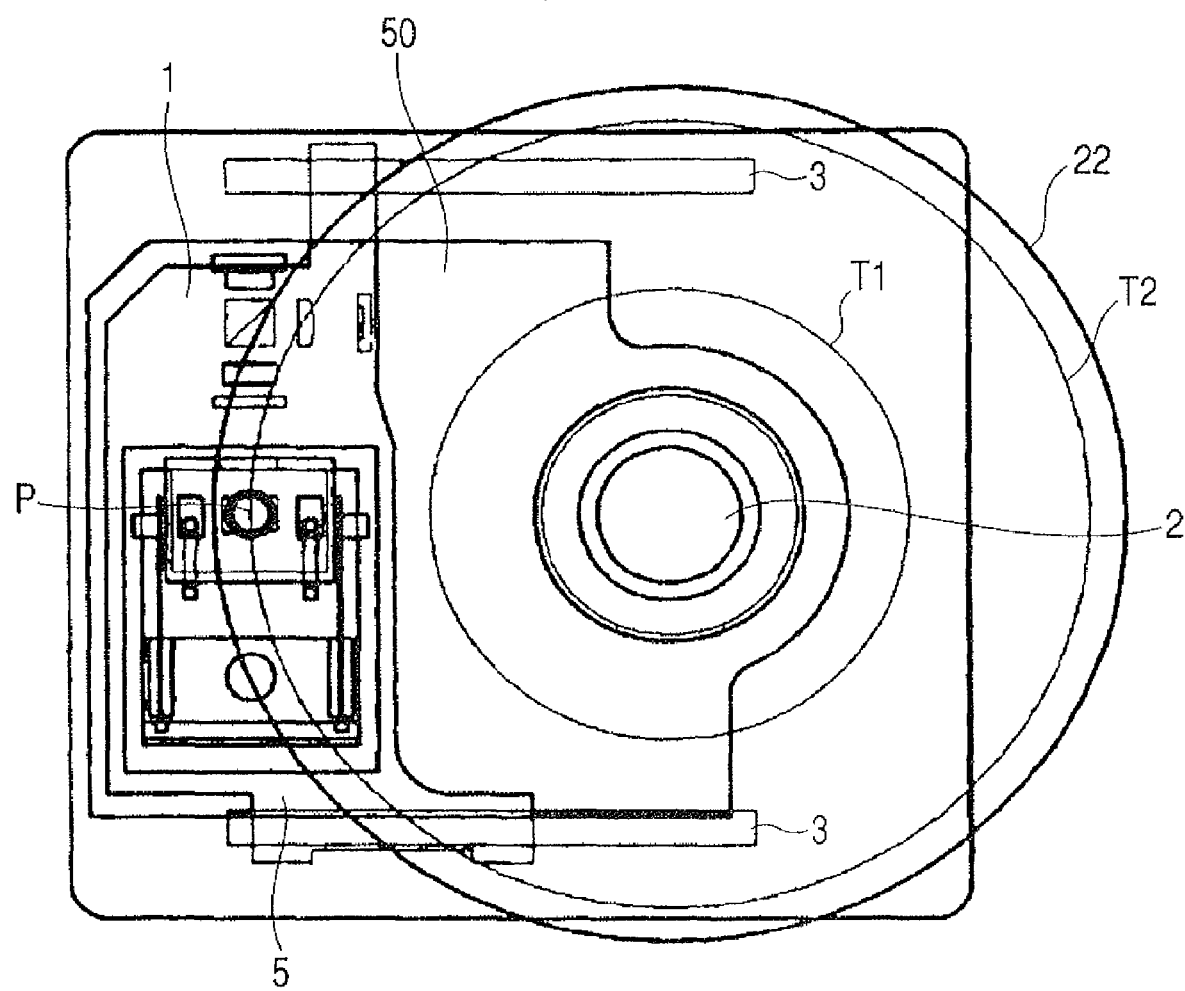
FIG. 8 is a schematic plan view of a known optical disk device, where the optical pickup is located right above the outermost periphery of the recording track or tracks.

FIG. 3 is a schematic plan view of this embodiment where the optical pickup 1 is located right above the outermost periphery T2. Under this condition, it will be seen that the extent to which the optical pickup 1 projects to the outside of the outer edge 22 of the optical disk 50 is reduced, if compared with the known optical disk device illustrated in FIG. 8. Then, as a result, the outer dimensions of the chassis 4 can be brought closer to the outer dimensions of the optical disk 50.

Conversely, when the optical pickup 1 is moved toward the inner periphery, the optical pickup 1 can be moved more toward the inner periphery, without making the fitting sections 19a1 and 19a2, which are arranged in the inner region, collide with the spindle motor 2. Then, the recording capacity of the optical disk can be increased by inwardly shifting the innermost periphery T1 of the recording track or tracks of the optical disk.

Second Embodiment

Figure 4A:
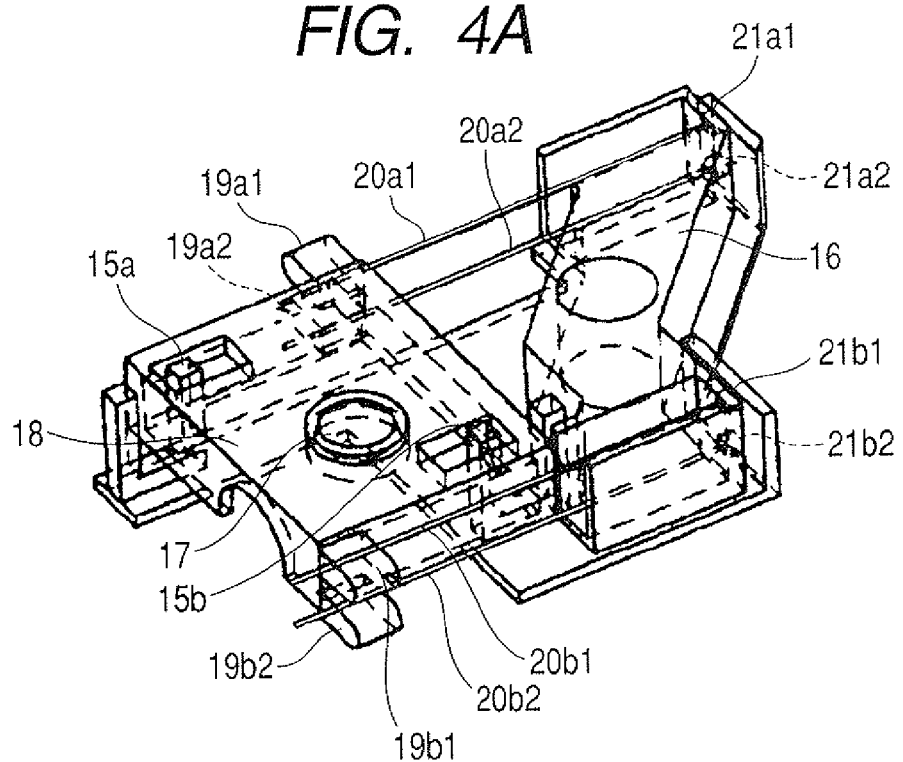
FIGS. 4A and 4B are a schematic perspective view and a schematic plan view of the second embodiment of an actuator according to the present invention.
Figure 4B:
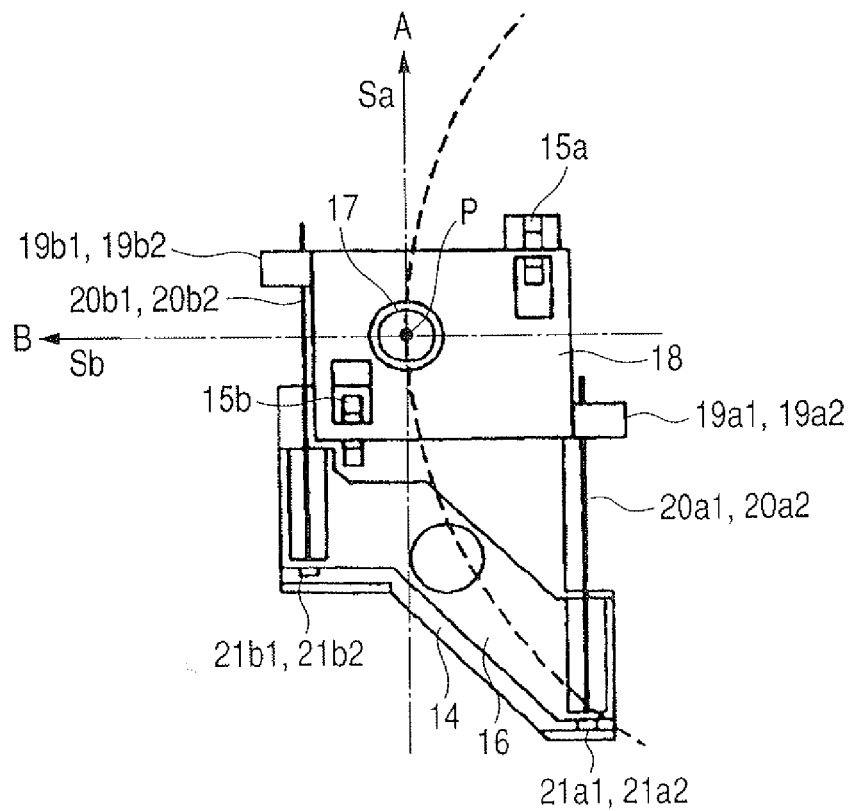

FIGS. 4A and 4B are a schematic perspective view and a schematic plan view of the second embodiment of an actuator according to the present invention. The overall configuration of the optical disk device of this embodiment is similar to the overall configuration of the optical disk device of FIG. 1. In FIGS. 4A and 4B, the same components as the components of the first embodiment are denoted by the same reference symbols as those of the components of FIGS. 2A and 2B. Since the overall configuration of the actuator 13 of this embodiment is the same as the overall configuration of the first embodiment, it will not be described in detail here.

FIG. 4B illustrates the tangent line to the recording track of the optical disk at the position P of the laser beam irradiated from the objective lens 17 onto the optical disk (in FIG. 4B, arrow A indicates the direction of the tangent line). In this embodiment again, the elastic supporting members 20a1 and 20a2 are arranged substantially in parallel with each other in the inner region (the region that includes the center of the optical disk), which includes the tangent line to the recording track and that is separated by an imaginary plane Sa that is perpendicular to the optical disk. The elastic supporting members 20b1 and 20b2 are arranged substantially in parallel with each other in the outer region.

FIG. 4B also illustrates the normal line to the recording track of the optical disk at the laser beam irradiating position P on the recording track (in FIG. 4B, arrow B indicates the direction of the normal line).

If an imaginary plane that includes the normal line and is perpendicular to the optical disk is Sb, the fitting sections 19b1 and 19b2 at the front ends and the anchor sections 21b1 and 21b2 at the base ends of the elastic supporting members 20b1 and 20b2, which are arranged in the outer region, are located at the opposite sides relative to the imaginary plane Sb. On the other hand, the fitting sections 19a1 and 19a2 at the front ends and the anchor sections 21a1 and 21a2 at the base ends of the elastic supporting members 20a1 and 20a2, which are arranged in the inner region, are located at one side relative to the imaginary plane Sb.

In short, like FIGS. 2A and 2B, of the four elastic supporting members arranged in parallel with each other between the fitting sections of the lens holding member 18 and the supporting unit base 16, the two elastic supporting members 20a1 and 20a2 located at the peripheral side of the optical disk and the two elastic supporting members 20b1 and 20b2 located at the outer peripheral side of the optical disk are arranged transversally asymmetrically relative to each other.

More specifically, the elastic supporting members 20b1 and 20b, located at the outer peripheral side of the optical disk, are arranged at a forward position of the lens holding member 18, whereas the elastic supporting members 20a1 and 20a2, located at the inner peripheral side of the optical disk, are arranged at a rearward side of the lens holding member 18. In other words, the elastic supporting members 20a1 and 20a2 are shifted rearward relative to the elastic supporting members 20b1 and 20b2.

The outer dimensions of the lens holding member 18 are substantially the same as the outer dimensions of the lens holding member 18 of the first embodiment.

However, the objective lens 17 is fitted not to the center of the lens holding member 18, but to a position closer to the fitting sections 19b1 and 19b2 at the front ends of the elastic supporting members 20b1 and 20b2.

In harmony with the above-described arrangement, the overall profile of the supporting unit base 16 is made asymmetric (and illustrates a contour similar to the contour of a parallelogram). The optical unit base 5 and the chassis 4 are also made to show a minimal profile to match the positional arrangement and the profile of the actuator 13. For example, the optical unit base 5 is provided with a recess 51 at the side thereof facing the spindle motor 2.

Figure 5:
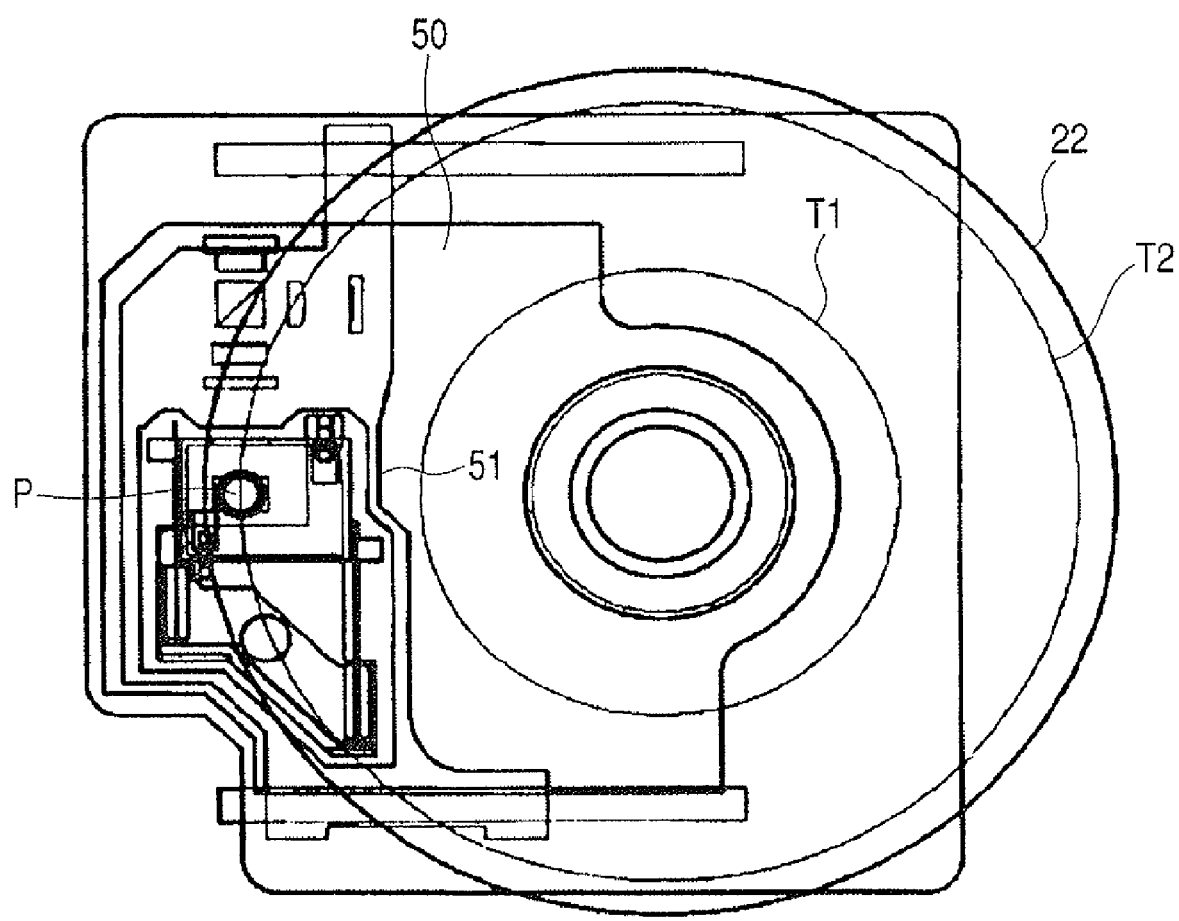
FIG. 5 is a schematic plan view of the second embodiment where the optical pickup is located right above the outermost periphery of the recording track or tracks.

FIG. 5 is a schematic plan view of this embodiment, where the optical pickup 1 is located right above the outermost periphery T2.

As the objective lens 17 is fitted to a position closer to the fitting sections 19b1 and 19b2, it is possible to further reduce the extent to which the optical pickup 1 projects to the outside from the outer edge 22 of the optical disk, if compared with the first embodiment illustrated in FIG. 3. Then, as a result, the outer dimensions of the chassis 4 can be brought closer to the outer dimensions of the optical disk 50.

Conversely, when the optical pickup 1 is moved toward the inner periphery, the optical pickup 1 can be moved more toward the inner periphery without making the fitting sections 19a1 and 19a2, which are arranged in the inner region, collide with the spindle motor 2. Then, the recording capacity of the optical disk can be increased by inwardly shifting the innermost periphery T1 of the recording track or tracks of the optical disk.

Thus, according to the present invention, it is possible to reduce the extent to which the optical pickup projects to the outside from the outer edge of the optical disk when it is moved to the outermost periphery of the recording track or tracks. The advantage of the present invention is particularly remarkable to optical disks having a small diameter. Then, as a result, it is now possible to realize a small optical disk device with a chassis having outer dimensions closer to those of the optical disk and hence, it is possible to downsize and to reduce the weight of a portable electronic apparatus realized by using such an optical disk device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical disk device for driving an optical disk having a rotation center and a recording track around the rotation center, the device comprising:

a light source for emitting a light beam;

an objective lens for irradiating a position on the recording track of the optical disk with the light beam from the light source;

a lens holding member holding the objective lens, the lens holding member having a plurality of fitting sections;

a plurality of elastic supporting members each having a longitudinal length and fitted at one end thereof to one of the fitting sections of the lens holding member; and a supporting unit base having a plurality of anchor sections supporting the other end of each of the elastic supporting members, wherein the plurality of anchor sections are arranged on first and second sides with reference to a tangent line hypothetically drawn tangentially to the recording track at the position irradiated with the light beam via the objective lens, the rotation center of the optical disk being located on the second side, and wherein each of the anchor sections that are arranged on the first side are arranged closer to the objective lens in the extending direction of the tangent line than are the anchor sections arranged on the second side.

2. The device according to claim 1, wherein the center of gravity of any movable part, including the objective lens and the lens holding member, agrees with the center of support of the elastic supporting members by the fitting sections.

3. The device according to claim 1, wherein the objective lens is arranged lopsidedly at the side of the elastic supporting members located at the first side of the optical disk.

* * * * *